(12) United States Patent
Farooq et al.

(10) Patent No.: US 11,345,301 B2
(45) Date of Patent: May 31, 2022

(54) MOVEABLE ROOF SUPPORTED AIRBAG

(71) Applicant: Ford Global Technologies, LLC, Dearborn, MI (US)

(72) Inventors: S. M. Iskander Farooq, Novi, MI (US); Mohammad Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/090,127

(22) Filed: Nov. 5, 2020

(65) Prior Publication Data

US 2022/0134991 A1     May 5, 2022

(51) Int. Cl.
| | | |
|---|---|---|
| *B60R 21/214* | (2011.01) |
| *B60R 21/232* | (2011.01) |
| *B60R 21/26* | (2011.01) |
| *B60R 21/01* | (2006.01) |
| *B60R 21/02* | (2006.01) |
| *B60R 21/00* | (2006.01) |

(52) U.S. Cl.
CPC .......... *B60R 21/214* (2013.01); *B60R 21/232* (2013.01); *B60R 21/26* (2013.01); *B60R 2021/0032* (2013.01); *B60R 2021/01034* (2013.01); *B60R 2021/01211* (2013.01); *B60R 2021/01286* (2013.01); *B60R 2021/0213* (2013.01); *B60R 2021/0273* (2013.01)

(58) Field of Classification Search
CPC .......... B60R 21/214; B60R 2021/0213; A61G 3/0808
See application file for complete search history.

(56) References Cited

U.S. PATENT DOCUMENTS

| | | | |
|---|---|---|---|
| 4,536,008 A  * | 8/1985 | Brown, Jr. ............ | B60R 21/213 280/736 |
| 9,789,840 B2 | 10/2017 | Farooq et al. | |
| 10,285,880 B1 | 5/2019 | Ghannam et al. | |
| 10,427,637 B2 * | 10/2019 | Raikar ....................... | B60J 7/02 |
| 10,449,923 B2 * | 10/2019 | Son ........................ | B60R 21/233 |
| 10,471,924 B2 * | 11/2019 | Min ...................... | B60R 21/214 |
| 10,556,564 B2 * | 2/2020 | Lee ........................ | B60R 21/231 |
| 10,604,103 B2 * | 3/2020 | Lee ...................... | B60R 21/2338 |
| 10,625,705 B2 * | 4/2020 | Min ...................... | B60R 21/214 |
| 10,821,038 B2 * | 11/2020 | Collett .................... | B60P 1/433 |
| 10,829,162 B2 * | 11/2020 | Quiros Perez ............ | B60R 5/04 |
| 10,998,040 B2 * | 5/2021 | Shu ........................ | G11C 11/418 |

(Continued)

FOREIGN PATENT DOCUMENTS

| | | | | |
|---|---|---|---|---|
| CN | 205836757 U | * | 12/2016 | .......... B60R 21/214 |
| CN | 112721849 A | * | 4/2021 | |

(Continued)

*Primary Examiner* — Nicole T Verley
(74) *Attorney, Agent, or Firm* — Frank A. MacKenzie; Bejin Bieneman PLC

(57) ABSTRACT

A vehicle includes a floor and a roof. A panel is removably attached to and supported by the floor. The panel is designed to engage a personal mobility device. An airbag housing is supported by the roof and moveably relative to the roof along a cross-vehicle axis and along a vehicle-longitudinal axis. An airbag is supported by the airbag housing. The airbag is inflatable to an inflated position that extends from the airbag housing towards the panel.

19 Claims, 10 Drawing Sheets

(56) References Cited

U.S. PATENT DOCUMENTS

| | | | |
|---|---|---|---|
| 11,059,448 B2* | 7/2021 | Rutelin | B60R 21/216 |
| 11,142,157 B2* | 10/2021 | Kim | B60R 21/231 |
| 11,148,517 B2* | 10/2021 | Hammond, Jr | B60K 1/04 |
| 11,186,246 B2* | 11/2021 | Min | B60R 21/232 |
| 11,192,515 B2* | 12/2021 | Jayakar | B60R 21/214 |
| 11,220,226 B2* | 1/2022 | Forgette | B60R 13/0225 |
| 11,227,653 B1* | 1/2022 | Shu | G11C 11/418 |
| 2002/0070537 A1 | 6/2002 | Webber et al. | |
| 2003/0197354 A1* | 10/2003 | Beland | B60R 13/0225 280/751 |
| 2010/0086375 A1* | 4/2010 | Tremblay | A61G 3/0808 410/7 |
| 2017/0267204 A1* | 9/2017 | Farooq | B60R 21/231 |
| 2018/0162315 A1* | 6/2018 | Lee | B60R 21/2346 |
| 2018/0312130 A1* | 11/2018 | Min | B60R 21/214 |
| 2019/0016292 A1* | 1/2019 | Son | B60R 21/262 |
| 2019/0133852 A1* | 5/2019 | Ghannam | A61G 3/0808 |
| 2019/0143928 A1* | 5/2019 | Raikar | B60J 7/02 280/730.1 |
| 2019/0217804 A1* | 7/2019 | Cho | B60R 21/233 |
| 2019/0337479 A1* | 11/2019 | Hill | B60R 21/231 |
| 2019/0366968 A1* | 12/2019 | Park | B60R 21/214 |
| 2020/0062195 A1* | 2/2020 | Forgette | B60R 13/0206 |
| 2020/0070763 A1* | 3/2020 | Hill | B60R 21/214 |
| 2020/0207299 A1 | 7/2020 | Cheng | |
| 2020/0346607 A1* | 11/2020 | Kim | B60N 2/22 |
| 2020/0384939 A1* | 12/2020 | Rutgersson | B60R 21/01554 |
| 2020/0384940 A1* | 12/2020 | Sekizuka | B60R 21/01554 |
| 2021/0138987 A1* | 5/2021 | Lee | B60R 21/213 |
| 2021/0138996 A1* | 5/2021 | Min | B60R 21/26 |
| 2021/0155197 A1* | 5/2021 | Jeong | B60R 21/013 |
| 2021/0179003 A1* | 6/2021 | Min | B60R 21/214 |
| 2021/0179004 A1* | 6/2021 | Lee | B60R 21/2334 |
| 2021/0179005 A1* | 6/2021 | Jayakar | B60R 21/01 |
| 2021/0268986 A1* | 9/2021 | Gould | B60R 21/215 |
| 2021/0300286 A1* | 9/2021 | Young | B60R 21/013 |

FOREIGN PATENT DOCUMENTS

| | | | | |
|---|---|---|---|---|
| CN | 113147657 A | * | 7/2021 | B60R 21/214 |
| CN | 113276794 A | * | 8/2021 | B60N 2/0276 |
| DE | 19803164 A1 | * | 7/1999 | B60R 21/214 |
| DE | 19853479 A1 | * | 8/1999 | B60J 7/0015 |
| DE | 20106036 U1 | * | 8/2002 | A61G 3/0808 |
| DE | 202019106027 U1 | * | 12/2019 | B60J 7/043 |
| DE | 202020100026 U1 | * | 3/2020 | B60R 21/213 |
| DE | 202020107503 U1 | * | 4/2021 | B60R 21/213 |
| DE | 202021101051 U1 | * | 4/2021 | B60R 21/214 |
| DE | 102020204899 A1 | * | 6/2021 | B60N 2/14 |
| JP | 6069450 B1 | | 4/2017 | |
| KR | 20170031406 A | * | 3/2017 | |
| KR | 20170034249 A | * | 3/2017 | |
| KR | 20170049651 A | * | 5/2017 | |
| KR | 20200086023 A | * | 7/2020 | |
| KR | 20210113523 A | * | 10/2021 | |
| WO | WO-2004050435 A1 | * | 6/2004 | B60R 21/214 |
| WO | 2020088917 A1 | | 5/2020 | |

* cited by examiner

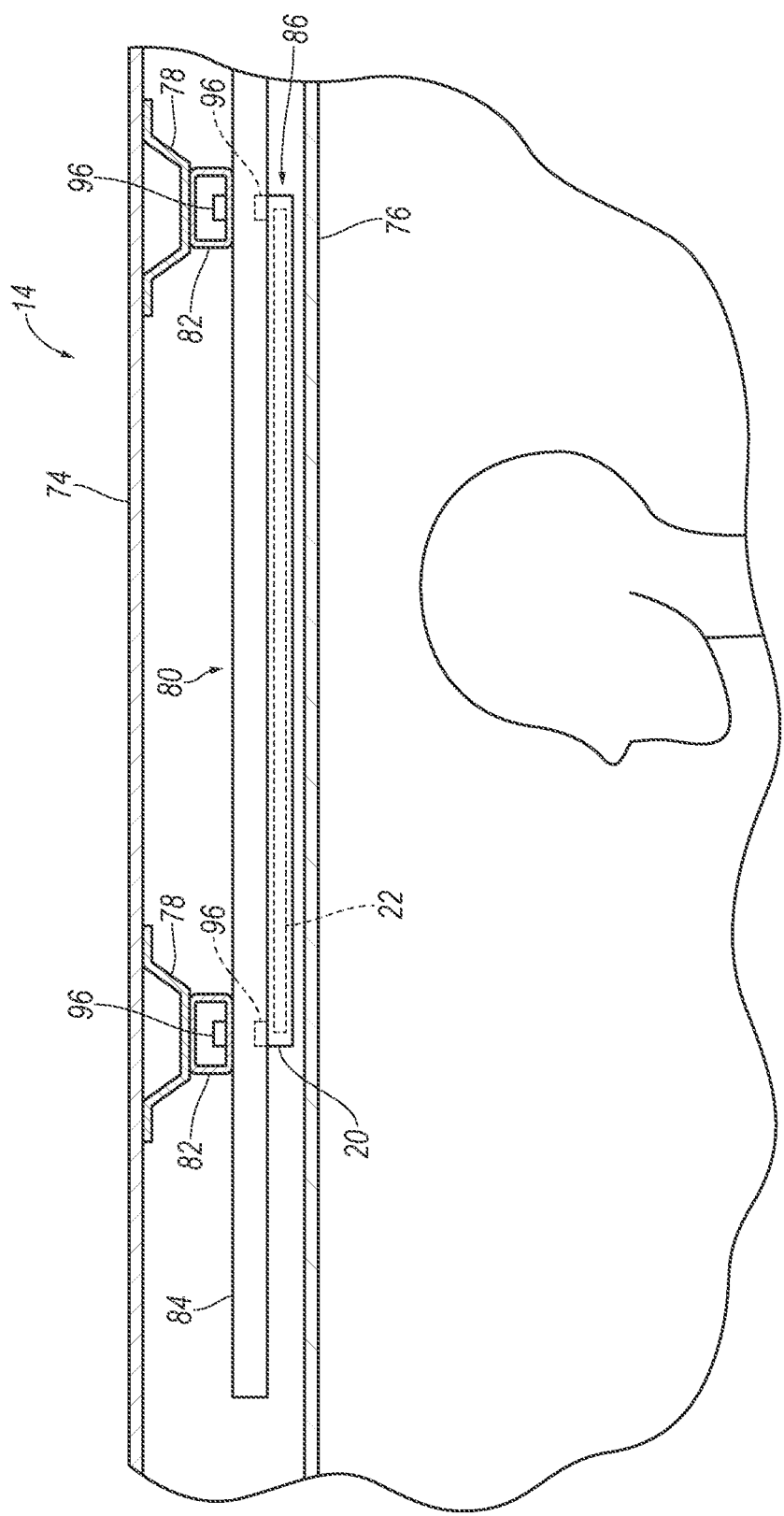

MOVEABLE ROOF SUPPORTED AIRBAG

BACKGROUND

Passenger vehicle are not typically designed to accommodate personal mobility devices. Therefore, accommodations for personal mobility devices in vehicles are typically installed with aftermarket modifications to a production vehicle. For example, a vehicle may be modified with a lift or the like to load a personal mobility device onto a vehicle. Often, a personal mobility device will be stowed in a cargo area once a passenger is transferred to a vehicle seat. Production vehicles typically do not have the ability to accommodate the personal mobility device of an occupant in a manner allowing the occupant to sit in the personal mobility device in the vehicle, or if they do, significant aftermarket modification is required.

BRIEF DESCRIPTION OF THE DRAWINGS

FIG. 3 is a cross section of the roof of the vehicle having an airbag in an uninflated position.

DETAILED DESCRIPTION

Figure 1:
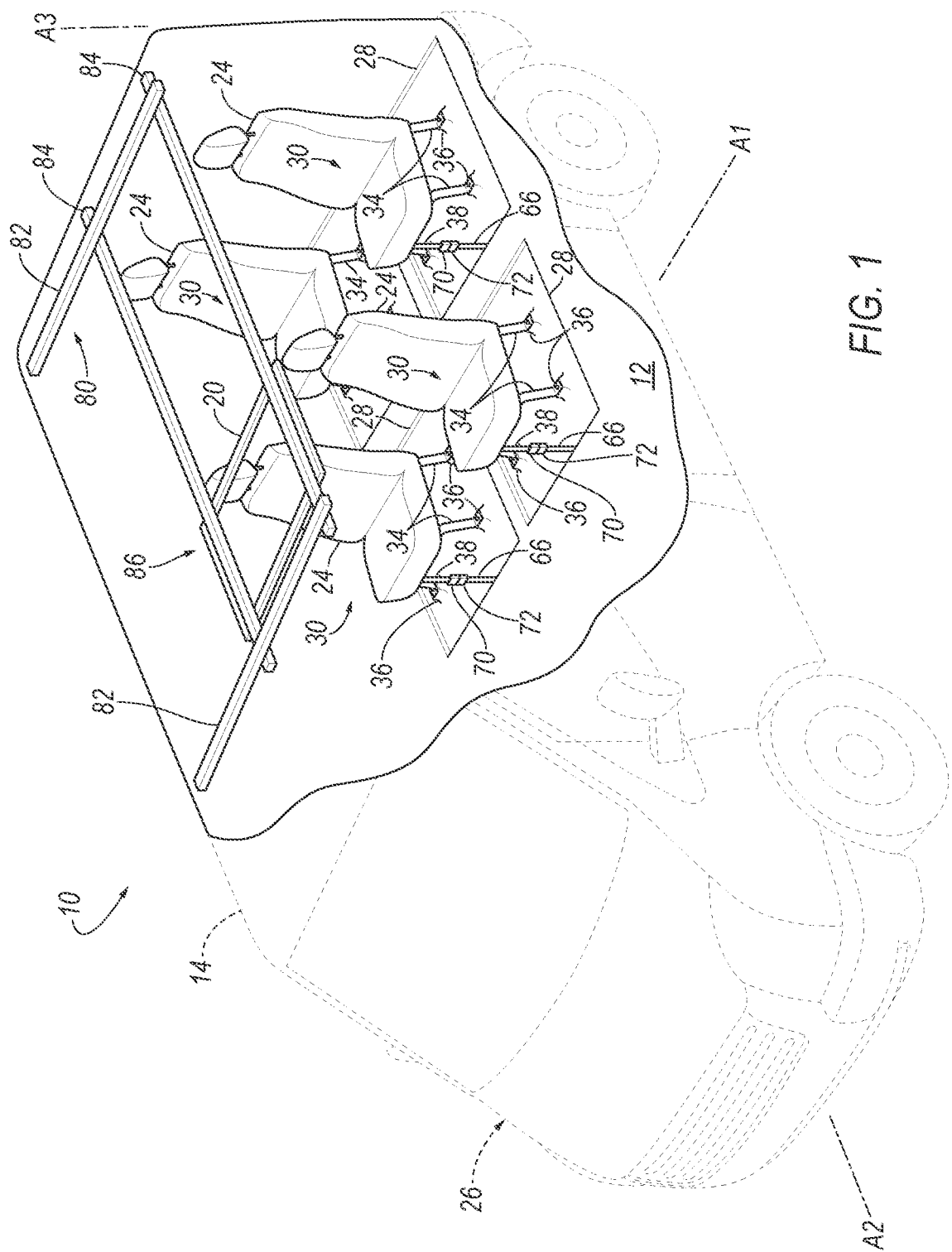
FIG. 1 is a perspective view of a vehicle including a track assembly supported by a roof.

A vehicle includes a floor and a roof. A panel is removably attached to and supported by the floor. The panel is designed to engage a personal mobility device. An airbag housing is supported by the roof and moveable relative to the roof along a cross-vehicle axis and along a vehicle-longitudinal axis. An airbag is supported by the airbag housing. The airbag is inflatable to an inflated position that extends from the airbag housing towards the panel.

The airbag may be designed to surround a personal mobility device in the inflated position.

The airbag housing may be translatable relative to the roof.

The vehicle may include a track assembly including a first track fixed to the roof and a second track slidably engaged with the first track. The airbag housing may be slidably engaged with the second track.

The first track may be elongated along the cross-vehicle axis, and the second track may be elongated along the vehicle-longitudinal axis.

The vehicle may include a computer having a processor and memory storing instructions executable by the processor to move the airbag based on determining a position of a personal mobility device.

The vehicle may include a wiring harness supported by the panel. The instructions may include further instructions executable to control inflation of the airbag based on connection of the wiring harness to the computer.

The vehicle may include a latch supported by the panel and designed to releasably engage a personal mobility device between a latched position and an unlatched position. A wiring harness may be supported by the panel and connected to the latch. The instructions may include further instructions executable to move the airbag additionally based on determining the latch is in the latched position.

The memory may store further instructions executable to determine the latch is in the latched position based on connection of the wiring harness to the computer.

The vehicle may include a wiring harness supported by the panel. The instructions may include further instructions executable to determine the position of the personal mobility device based on connection of the wiring harness to the computer.

The floor may include fastener holes arranged in a pattern and the panel may include fastener holes arranged in the pattern. Fasteners may engage the panel to the floor through the fastener holes of the panel and the floor.

The airbag, in an uninflated position, may be designed to be spaced from a personal mobility device along an axis extending transverse to the cross-vehicle axis and the vehicle-longitudinal axis.

The vehicle may include an actuator supported by the roof and designed to move the airbag housing.

The vehicle may include an inflator supported by the airbag housing.

A system includes a computer having a processor and a memory. The memory stores instructions executable by the processor to detect a panel attached to a floor of a vehicle. The instructions include further instructions to determine a position of a personal mobility device in response to detecting the personal mobility device engaged with the panel. The instructions include further instructions to move an airbag along at least one of a cross-vehicle axis or a vehicle-longitudinal axis based on the position of the personal mobility device.

The instructions may further include instructions to control inflation of the airbag based on connection of a wiring harness to the computer. The wiring harness may be supported by the panel.

The instructions may further include instructions to determine the panel is attached to the floor based on connection of a wiring harness to the computer. The wiring harness may be supported by the panel.

The instructions may further include instructions to determine the position of the personal mobility device based on connection of a wiring harness to the computer. The wiring harness may be supported by the panel.

The instructions may further include instructions to move the airbag additionally based on determining a latch is in a latched position. The latch may be supported by the panel and may be moveable to a latched position engaged with the personal mobility device The instructions may further include instructions to determine the latch is in the latched position based on connection of a wiring harness to the computer. The wiring harness may be supported by the panel.

With reference to the Figures, wherein like numerals indicate like parts throughout the several views, a vehicle 10 is generally shown. The vehicle 10 includes a floor 12 and a roof 14. A panel 16 is removably attached to and supported by the floor 12. The panel 16 is designed to engage a personal mobility device 18. An airbag housing 20 is supported by the roof 14 and is moveable relative to the roof 14 along a cross-vehicle axis A1 and along a vehicle-longitudinal axis A2. An airbag 22 is supported by the airbag housing 20. The airbag 22 is inflatable to an inflated position that extends from the airbag housing 20 towards the panel 16.

Figure 4:
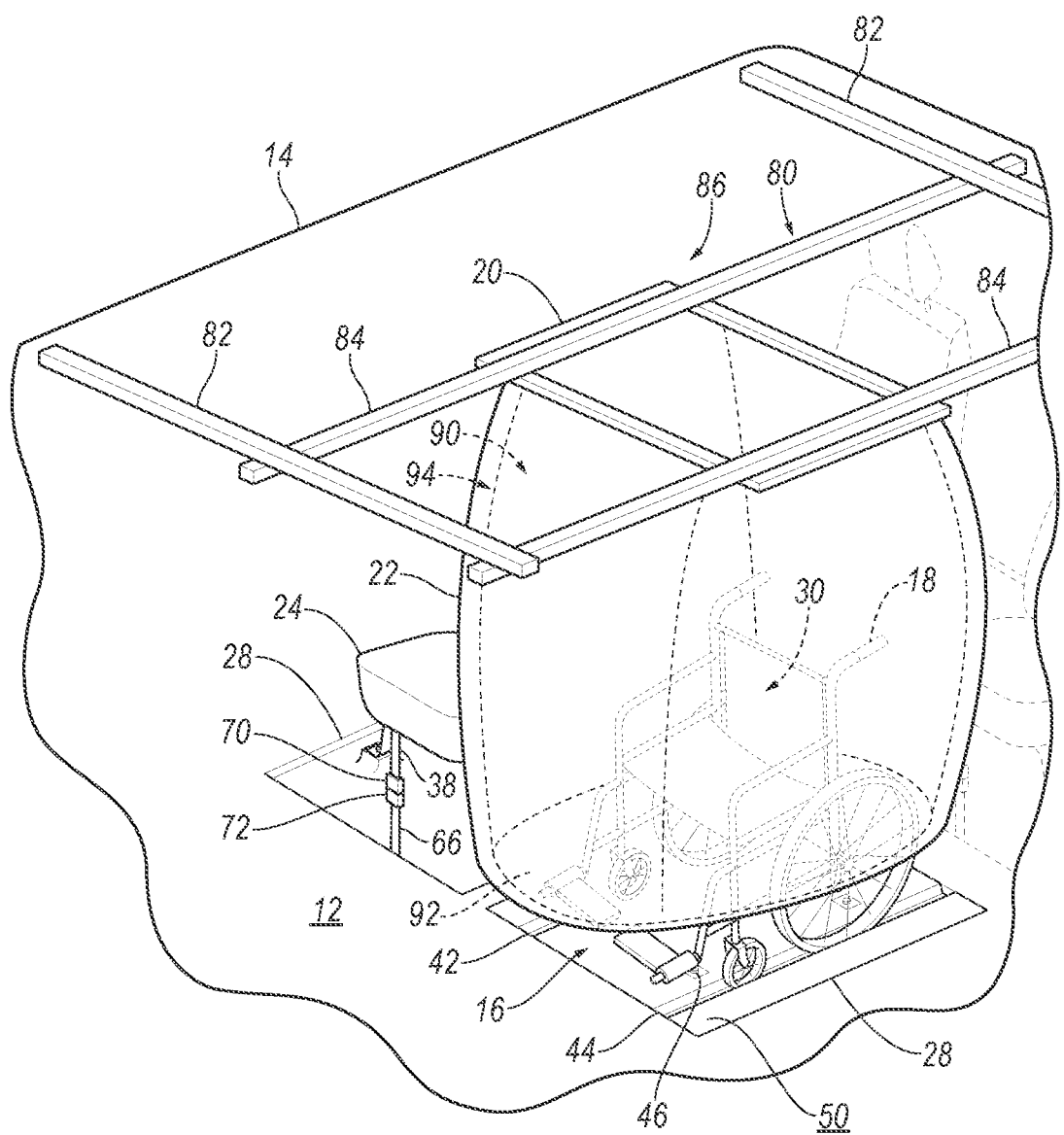
FIG. 4 is a perspective view of the vehicle having the airbag in an inflated position.

The vehicle 10 may be reconfigured to house and engage a personal mobility device 18. For example, the personal mobility device 18 may replace a seat 24 in the vehicle 10 and be locked to the vehicle 10, as discussed further below. When the personal mobility device 18 is engaged in the vehicle 10, the airbag 22 may be moved to correspond to a position of the personal mobility device 18 in the vehicle 10. During a vehicle impact, the airbag 22 may be inflated from an uninflated position, as shown in FIGS. 1-3, to an inflated position, as shown in FIG. 4. During the vehicle impact, an occupant of the personal mobility device 18 may be forced into the airbag 22 in the inflated position. The airbag 22 may provide coverage so as to control the kinematics of the occupant of the personal mobility device 18. By moving the airbag 22 to correspond to the position of the personal mobility device 18, the airbag 22 provides coverage to control the kinematics of the occupant of the personal mobility device 18 regardless of the position of the personal mobility device 18 in the vehicle 10.

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

With reference to FIG. 1, the vehicle 10 includes the vehicle body 26. The vehicle body 26 may be of a unibody construction. In the unibody construction, the body, e.g., rockers, serves as a vehicle frame, and the vehicle body 26 (including the rockers, pillars, roof rails, etc.) is unitary, i.e., a continuous one-piece unit. As another example, the vehicle body 26 and frame may have a body-on-frame construction (also referred to as a cab-on-frame construction). In other words, the vehicle body 26 and frame are separate components, i.e., are modular, and the vehicle body 26 is supported on and affixed to the frame. Alternatively, the vehicle body 26 may have any suitable construction. The vehicle body 26 may be formed of any suitable material, for example, steel, aluminum, etc.

The vehicle body 26 defines a passenger cabin to house occupants, if any, of the vehicle 10. The passenger cabin may extend across the vehicle 10, i.e., from one side to the other side of the vehicle 10. The passenger cabin includes a front end and a rear end with the front end being in front of the rear end during forward movement of the vehicle 10. The passenger cabin may house one or more seats 24 and/or personal mobility devices 18.

The floor 12 is spaced from the roof 14 along an axis A3 transverse to the cross-vehicle axis A1 and the vehicle-longitudinal axis A2. Specifically, the floor 12 is below the roof 14. The roof 14 may define an upper boundary of the passenger cabin and may extend from the front end of the passenger cabin to the rear end of the passenger cabin. The floor 12 may define the lower boundary of the passenger cabin and may extend from the front end of the passenger cabin to the rear end of the passenger cabin. That is, the passenger cabin may extend from the floor 12 to the roof 14.

The floor 12 may include a plurality of recesses 28 extending away from the roof 14. The floor 12 may include upholstery, for example, carpet, and may have a class-A surface facing the passenger cabin, i.e., a surface specifically manufactured to have a high quality, finished, aesthetic appearance free of blemishes. The upholstery may be outside the recesses 28 and extend to a boundary of the recesses 28. Each recess 28 may be designed to support one seat 24 or one panel 16. That is, one seat 24 or one panel 16 may engage the floor 12 in one respective recess 28.

With reference to FIGS. 1-4, the vehicle 10 includes an occupant seating area 30 above the floor 12. Specifically, one occupant seating area 30 is above each respective recess 28, i.e., aligned with the respective recess 28 and between the respective recess 28 and the roof 14. The occupant seating area 30 is an area in the passenger cabin of the vehicle 10 that is occupied by a seated occupant during operation of the vehicle 10. The occupant seating area 30 may be designed to house a seat 24 or a personal mobility device 18, as described further below. The vehicle 10 may include more than one occupant seating area 30 with at least one occupant seating area 30 designed to house one seat 24 or one personal mobility device 18. The vehicle 10 may be reconfigured to change the occupant seating area 30 between one designed to house the seat 24 and one designed to house the personal mobility device 18. The occupant seating area 30 may extend from the floor 12 to an uppermost point on the seat 24 or the personal mobility device 18, i.e., towards the roof 14. For example, the occupant seating area 30 may extend from the floor 12 to the uppermost point on an occupant seated in the occupant seating area 30.

With continued reference to FIG. 1, the vehicle 10 includes at least one seat 24. Specifically, the vehicle 10 may include any suitable number of seats 24. As shown in FIG. 1, the seats 24 are supported by the floor 12. The seats 24 may be arranged in any suitable arrangement in the passenger cabin. For example, one or more of the seats 24 may be at the front end of the passenger cabin, e.g., a driver seat and/or a passenger seat, and/or one or more of the seats 24 may be at the rear end of the passenger cabin, i.e., a rear seat.

The seats 24 may be removably attached to the floor 12, i.e., the seats 24 may not be permanently fixed to the floor 12. The floor 12 may include fastener holes 32 arranged in a pattern and the seats 24 may have a mounting base 34 including fastener holes 36 arranged in the pattern of the floor 12. The fastener holes 32 of the floor 12 may be disposed in the recesses 28. That is, in an example where the seat 24 is installed, the seat 24 may be installed in one recess 28.

The seat 24 may include a fastener, e.g., screws, threaded bolts, etc., to removably attach the seat 24 with the floor 12 through the fastener holes 36 of the seat 24 and the fastener holes 32 of the floor 12. The fastener may be removed from the fastener holes 36 of the seat 24 and the fastener holes 32 of the floor 12 to remove the seat 24 from the passenger cabin.

As shown in FIG. 1, each seat 24 may include a seat wiring harness 38. The seat wiring harness 38 transmits signals to and from components of the seat 24 and may provide power to components of the seat 24. The seat wiring harness 38 may be releasably connectable to a computer 40 of the vehicle 10, e.g., a restraints control module (RCM), and the computer 40 transmits signals to and/or receives signals from components of the seat 24, e.g., seat belt assemblies, seat position sensors, etc.

Figure 2A:
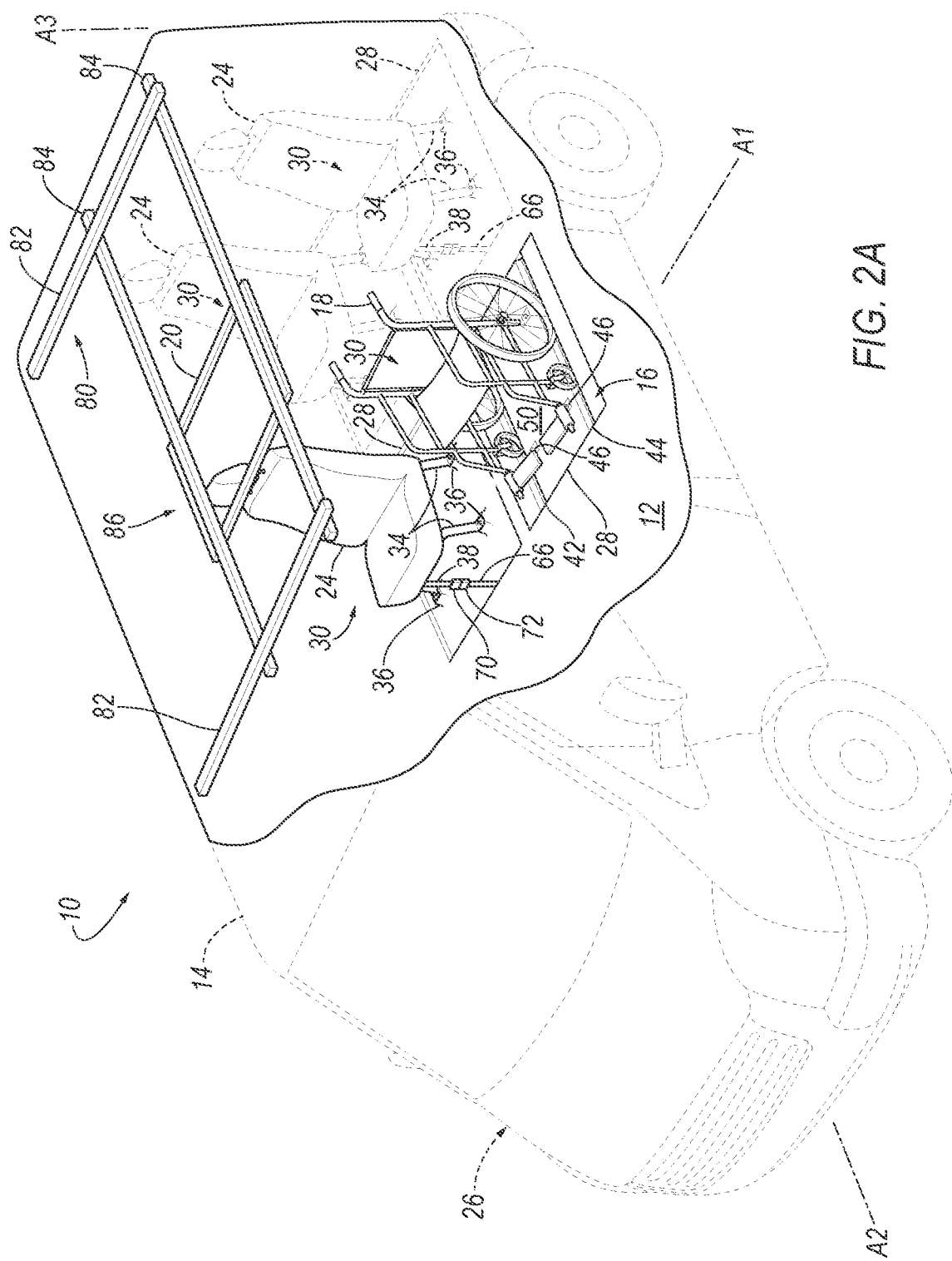
FIG. 2A is a perspective view of the vehicle including a panel in a recess in a floor and designed to engage a wheel of a personal mobility device.
Figure 2B:
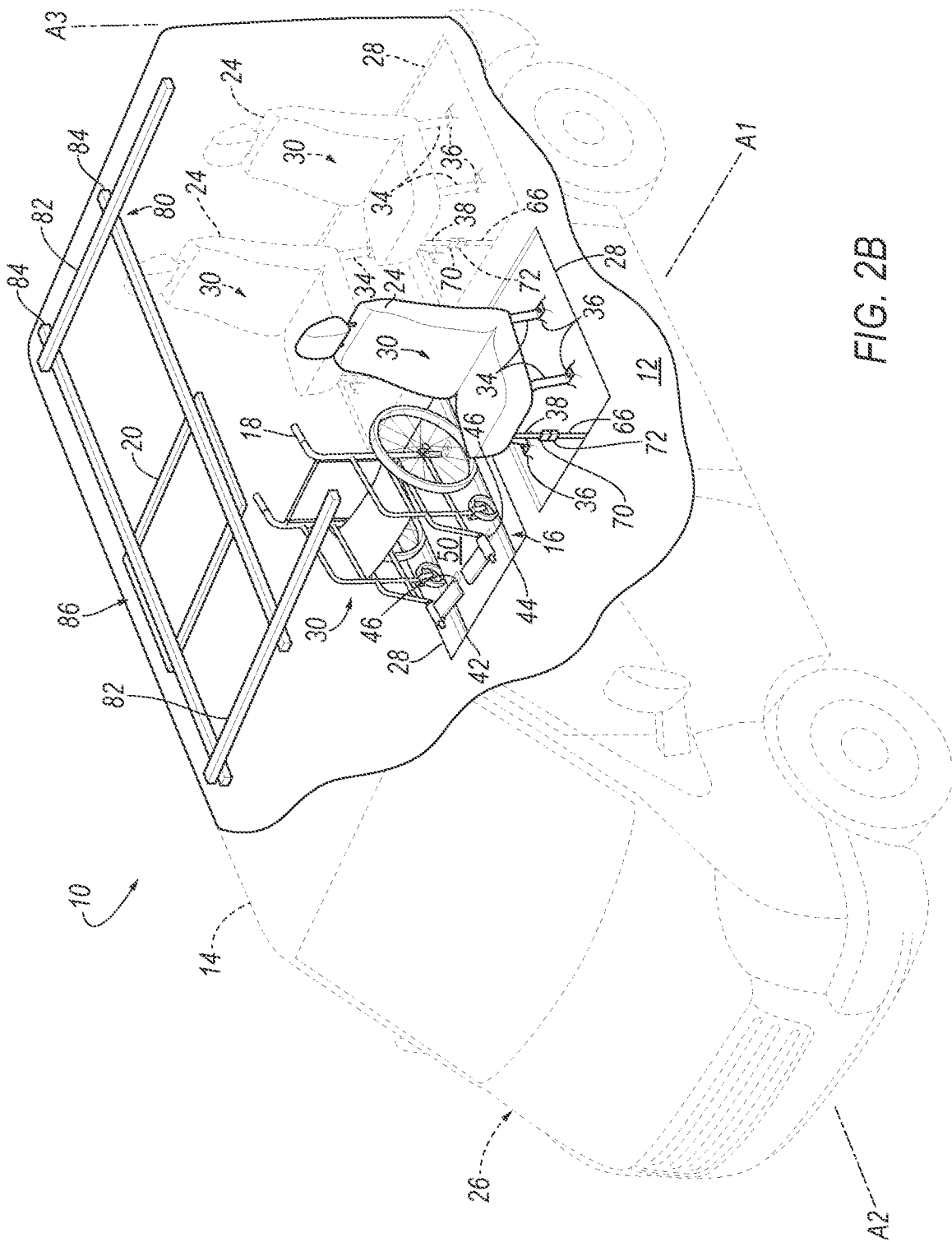
FIG. 2B is a perspective view of the vehicle including the panel in another recess in a floor.

With reference to FIGS. 2A and 2B, the panel 16 may be installed in the vehicle 10 to replace a seat 24 in the vehicle

10. The panel 16 may include a pair of channels 42, 44 spaced from each other along the cross-vehicle axis A1. The panel 16 is designed to engage wheels of the personal mobility device 18. That is, when the panel 16 is installed, a personal mobility device 18 may be engaged with the panel 16. Specifically, the channels 42, 44 of the panel 16 are designed to engage wheels of a personal mobility device 18. The channels 42, 44 are designed to receive the wheels of a personal mobility device 18 when a personal mobility device 18 is in the passenger cabin of the vehicle 10.

The panel 16 includes releasable connections 46 designed to releasably engage the floor 12. Specifically, the panel 16 is removably attached to and supported by the floor 12, i.e., the panel 16 is not permanently fixed to the floor 12. In other words, the releasable connections 46 of the panel 16 allow the panel 16 to be installed and connected to the floor 12 and allow the panel 16 to be removed from the floor 12. As shown in the Figures, a seat 24 in the vehicle 10, such a rear seat 24, may be removed from the vehicle 10 to replace the seat 24 with the panel 16. In other words, when a seat 24 is removed from the vehicle 10, the panel 16 may take the place of the seat 24 in the vehicle 10. If the panel 16 no longer is needed in the vehicle 10, the panel 16 may be removed from the vehicle 10 and replaced with the seat 24 that was removed. At any time, e.g., at the time of assembly or afterward by a service technician, the seat 24 and the panel 16 may be interchanged at any selected location in the vehicle 10.

There may be any suitable number of panels 16 in the vehicle 10. In the example shown in FIG. 1, the vehicle 10 includes no panels 16. In the examples shown in FIGS. 2A, 2B and 4, the vehicle 10 includes one panel 16.

Figure 5:
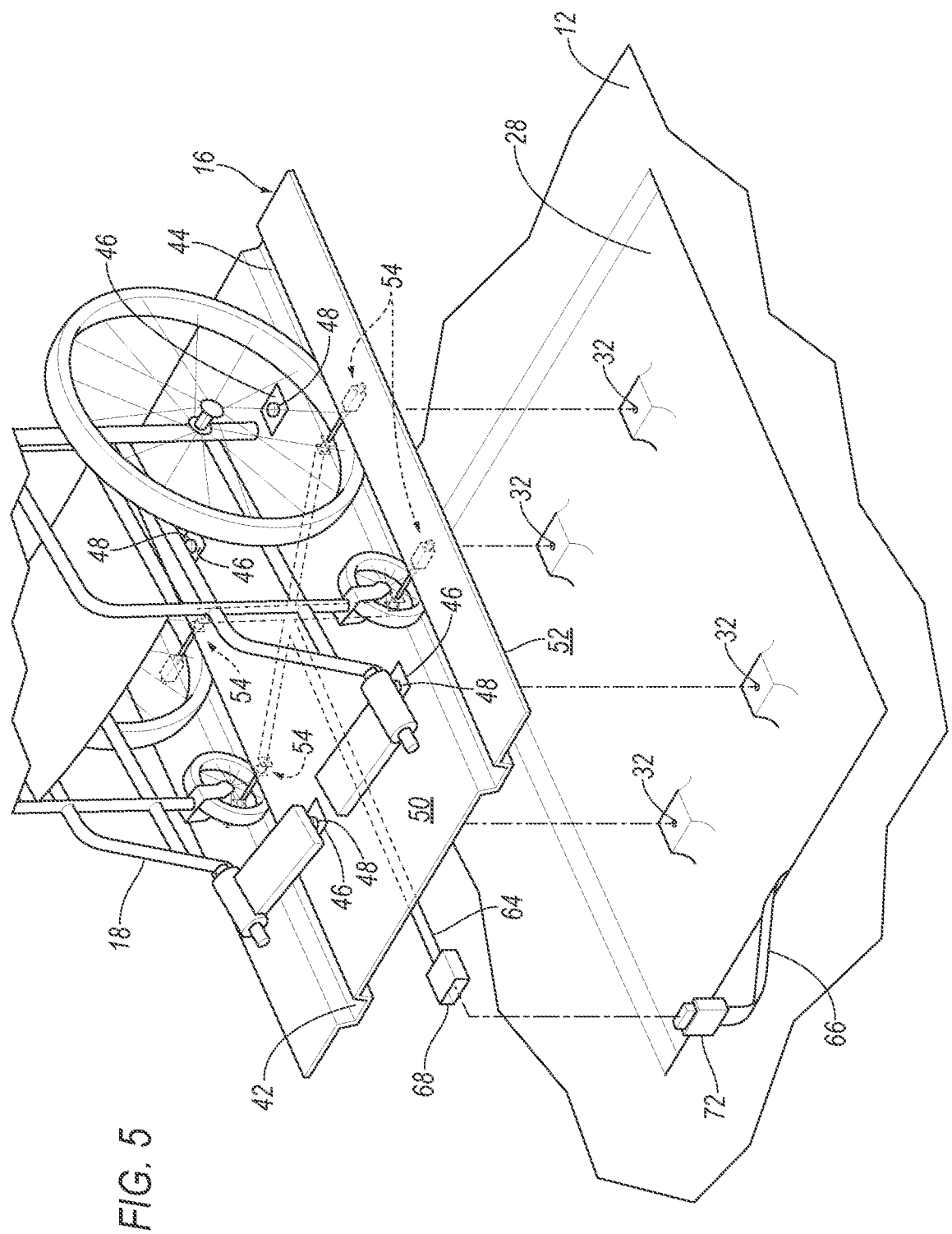
FIG. 5 is a perspective view of the panel including a latch including a solenoid engaged with wheels of a wheelchair.

The panel 16 may include fastener holes 48 arranged in the pattern of the fastener holes 32, 36 of the floor 12 and the seats 24. When the panel 16 is to be installed in the vehicle 10, the fastener holes 48 of the panel 16 align with the fastener holes 32 of the floor 12 to engage the panel 16 with the floor 12, as shown in FIG. 5. As shown in the Figures, the fastener holes 32, 36, 48 of the floor 12, seats 24, and panel 16 may be arranged in a square pattern. The fastener holes 32, 36, 48 may be arranged in any suitable pattern to engage the panel 16 with the floor 12. In an example where the panel 16 is installed in the vehicle 10, the panel 16 may be installed in one recess 28. An edge of the panel 16 may abut an edge of the upholstery on the floor 12, i.e., the edge of the panel 16 may be aligned with the edge of the upholstery to make a flat surface on the floor 12. The releasable connections 46 may be in the recess 28.

The panel 16 may include fasteners, e.g., screws, threaded bolts, etc., to engage the panel 16 to the floor 12 through the fastener holes 48 of the panel 16 and the floor 12. The fasteners extend through the fastener holes 48 of the panel 16 and the fastener holes 32 of the floor 12 to removably attach the panel 16 to the floor 12.

With reference to FIG. 5, the panel 16 includes a top surface 50 and a bottom surface 52. The top surface 50 faces into the passenger cabin of the vehicle 10. The bottom surface 52 faces opposite the top surface 50, i.e., away from the passenger cabin of the vehicle 10. The bottom surface 52 may be adjacent and facing the recess 28 when the panel 16 is installed in the vehicle 10. The fastener holes 48 of the panel 16 extend through the panel 16, i.e., through the top surface 50 and through to the bottom surface 52.

As discussed above, the panel 16 includes the pair of channels 42, 44 spaced from and parallel to each other. The pair of channels 42, 44 may be referenced as a first channel 42 and a second channel 44. The channels 42, 44 may be elongated along the panel 16. For example, as shown in the Figures, the channels 42, 44 may be elongated along the entire length of the panel 16, i.e., from one end of the panel 16 to the other. In another example, the channels 42, 44 may be elongated only along a portion of the panel 16.

The channels 42, 44 may extend longitudinally in the vehicle 10, i.e., the channels 42, 44 extend longitudinally between the front end and rear end of the passenger cabin. Extending longitudinally allows the wheels of a personal mobility device 18 to roll into the channels 42, 44 when the panel 16 is in use in the vehicle 10. The channels 42, 44 are on the top surface 50 of the panel 16, i.e., the channels 42, 44 face toward the passenger cabin to allow wheels of a personal mobility device 18 to roll into the channels 42, 44.

The panel 16 may include a latch 54 supported by the top surface 50. The latch 54 secures the wheel of a personal mobility device 18 when the wheel is disposed in one of the first or second channels 42, 44 of the panel 16. The latch 54 is positioned adjacent one of the channels 42, 44 such that the latch 54 may engage a wheel of the personal mobility device 18 in the respective channel 42, 44.

The panel 16 may include a plurality of latches 54. The panel 16 may include any suitable number of latches 54 to secure the wheels of the personal mobility device 18 and limit the movement of the personal mobility device 18 in the channels 42, 44. For example, the number of latches 54 may be equal to the number of wheels of the personal mobility device 18. In the example shown in the Figures, the panel 16 includes four latches 54, one latch 54 for each of the four wheels of the personal mobility device 18. In such an example, two latches 54 are spaced from each other adjacent the first channel 42 and two latches 54 are spaced from each other adjacent the second channel 44.

Figure 6A:
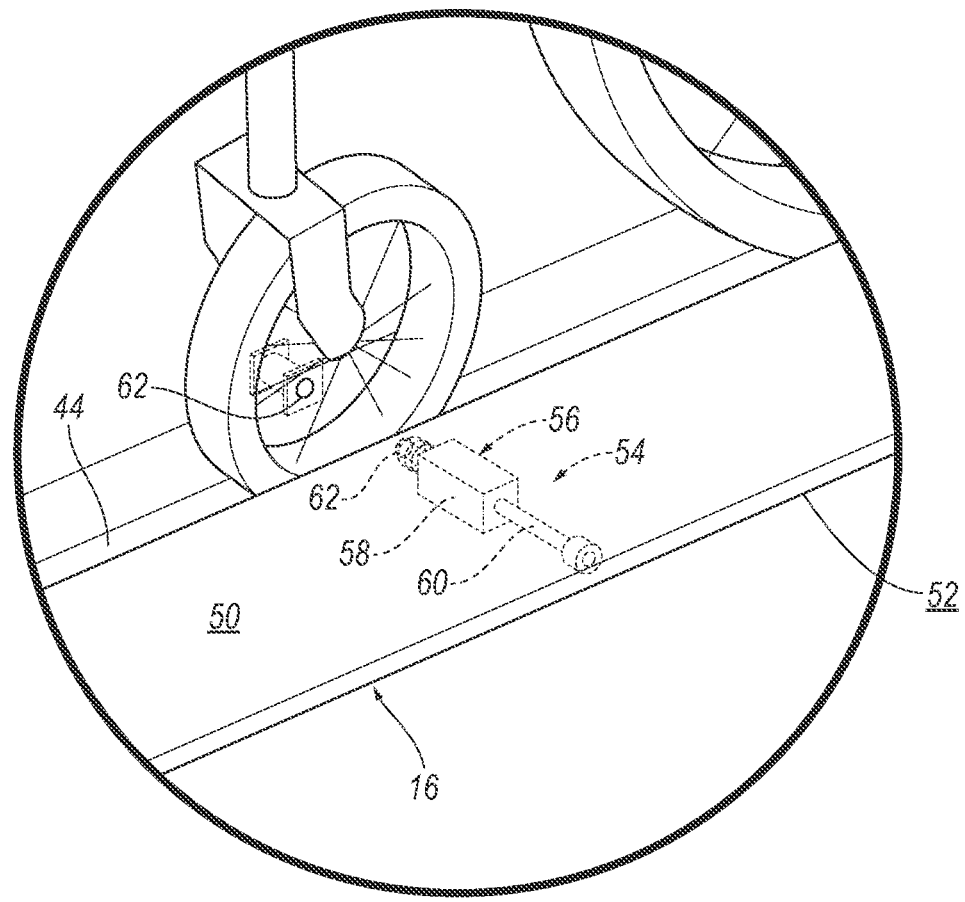
FIG. 6A is a perspective view of the latch including the solenoid in an unlatched position.
Figure 6B:
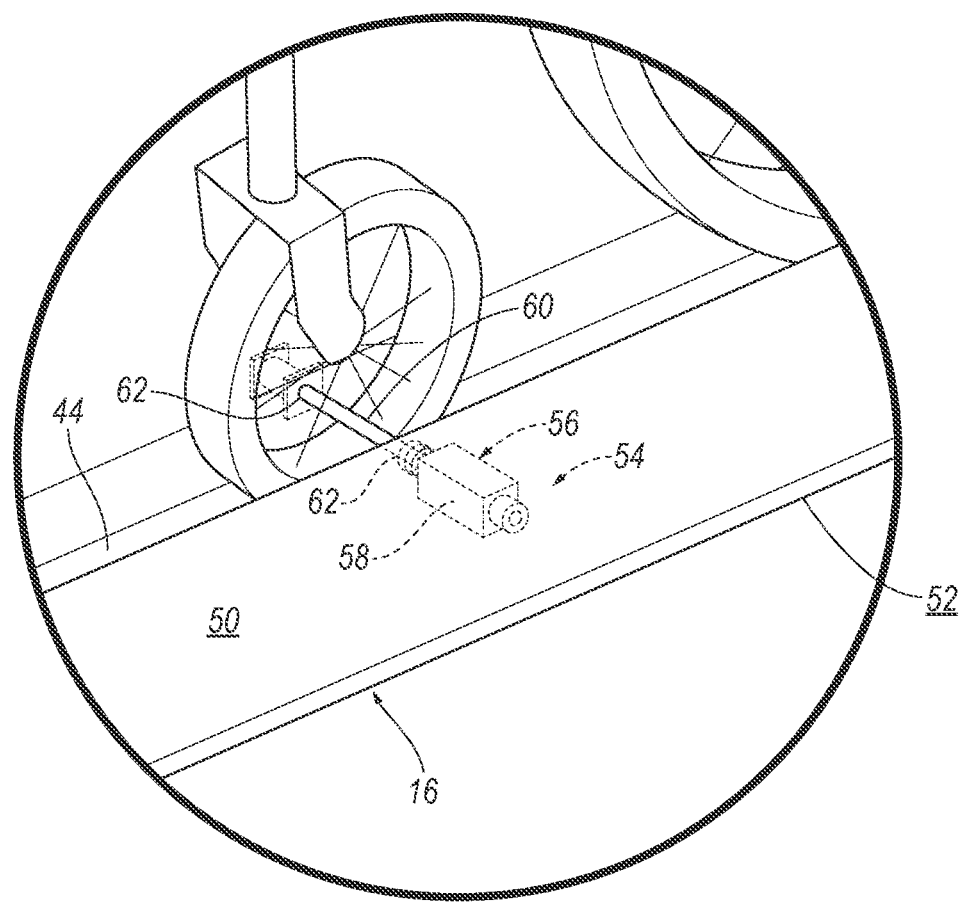
FIG. 6B is a perspective view of the latch including the solenoid in a latched position.

The latches 54 are designed to releasably engage a personal mobility device 18 between an unlatched position, as shown in FIG. 6A, and a latched position, as shown in FIG. 6B. That is, the latches 54 are moveable between an unlatched position and a latched position. When the latches 54 are in the unlatched position, the latches 54 are retracted from the channels 42, 44, i.e., the latch 54 is drawn away from the channel 42, 44 when the latch 54 is in the unlatched position. In the unlatched position, the wheels of the personal mobility device 18 may be free to roll and/or move within the channels 42, 44. When the latches 54 are in the latched position, the latches 54 are elongated across the channels 42, 44 in the latched position. In the latched position, the wheels of the personal mobility device 18 are unable to roll and/or more within the channels 42, 44. That is, the personal mobility device 18 may be fixed, i.e., locked, to the panel 16.

In the latched position, the latches 54 are designed to extend through a wheel of a personal mobility device 18 adjacent the latch 54. The latches 54 elongate across the channels 42, 44 and through the wheel of the personal mobility device 18 when in the latched position. The wheel of the personal mobility device 18 may include spokes, as shown in the Figures. The latch 54 limits the rolling and movement of the wheels of the personal mobility device 18 by extending through the wheel, i.e., between the spokes, and across the channels 42, 44.

With reference to FIGS. 6A and 6B, the latches 54 may be electronic. In such an example, the latch 54 includes a solenoid 56. The solenoid 56 includes a body 58 mounted to the panel 16 and a post 60 extendable from the body 58. The body 58 of the solenoid 56 may be disposed on the bottom surface 52 of the panel 16, i.e., the body 58 of the solenoid 56 may be between the panel 16 and the floor 12 of the vehicle 10.

The panel 16 may define a pair of holes 62 in the channels 42, 44 positioned adjacent the post 60 and body 58 of the solenoid 56. In the unlatched position, the post 60 of the solenoid 56 is retracted from the channel 42, 44 and is retracted from at least one of the holes 62 in the unlatched position. The wheels of the personal mobility device 18 are free to roll/move in the channel 42, 44 of the panel 16. The panel 16 may include a pair of holes 62 in the channels 42, 44 that correspond to each of the number of latches 54 supported by the panel 16. In other words, each latch 54 has a pair of holes 62 adjacent the latch 54.

In the latched position, the post 60 is elongated across the channel 42, 44. The post 60 extends from the body 58 of the solenoid 56, through both the holes 62, and is elongated across the channel 42, 44. Specifically, the post 60 of the solenoid 56 extends from the body 58 of the solenoid 56, through both holes 62, and across the top surface 50 of the panel 16 to the latched position. The post 60 of the solenoid 56 is designed to extend through a wheel of a personal mobility device 18 when the latch 54 is in the latched position. In the latched position, the wheel's movement in the channel 42, 44 of the panel 16 is limited because the post 60 of the solenoid 56 passes through the wheel of the personal mobility device 18.

Returning to FIG. 5, a wiring harness 64 (hereinafter referred to as the "panel wiring harness") is supported by the panel 16 and connected to the latches 54. Specifically, the panel wiring harness 64 may transmit signals to and from the latch 54 and may provide power to the latch 54. As discussed below, the panel wiring harness 64 may be releasably connectable to the computer 40 of the vehicle 10, e.g., the RCM, and the computer 40 transmits signals to and/or receives signals from the latch 54. For example, the panel wiring harness 64 may transmit signals indicating that the latch 54 is in the latched position or the unlatched position and/or may provide instruction, i.e., a signal, to the latch 54 to move between the latched position and the unlatched position. Specifically, in examples in which the latch 54 is a solenoid 56, the panel wiring harness 64 transmits signals to the solenoid 56 to move the post 60 between the latched position and the unlatched position.

The panel wiring harness 64 and the seat wiring harness 38 may be releasably connectable to the computer 40, e.g., the RCM. The vehicle 10 may include a plurality of wiring harnesses 66 (hereinafter referred to as "vehicle wiring harnesses") connected to the computer 40. Specifically, the vehicle 10 includes one vehicle wiring harness 66 at each recess 28, i.e., at each location that seat 24 or a panel 16 may be mounted. The panel wiring harness 64 and the seat wiring harness 38 may be releasably connectable to the vehicle wiring harnesses 66.

The panel wiring harness 64 and the seat wiring harness 38 are designed to engage the vehicle wiring harness 66 to transmit signals and/or power therethrough. The panel wiring harness 64 and the seat wiring harness 38 may be designed to be disconnected from the vehicle wiring harness 66 without destruction of the wiring harnesses. In other words, the panel wiring harness 64 and the vehicle wiring harness 66 may be repeatedly connected and disconnected and the seat wiring harness 38 and the vehicle wiring harness 66 may be repeatedly connected and disconnected. As an example, the panel wiring harness 64 and the seat wiring harness 38 may each include terminals 68, 70 that releasably engage a terminal 72 of the vehicle wiring harness 66. The terminals 68, 70, 72 may be, for example, quick disconnect terminals as is known in automotive application. The terminal 68 of the panel wiring harness 64 may be identical to the terminal 70 of the seat wiring harness 38, and the terminal 68 of the panel wiring harness 64 and the seat wiring harness 38 are each designed to mate, alternatively, with the terminal 72 of the vehicle wiring harness 66.

The personal mobility device 18 may be of any suitable type that supports a seated occupant. The personal mobility device 18 transports the seated occupant outside of the vehicle 10 and moves the seated occupant in the passenger cabin during ingress to and egress from the vehicle 10. The personal mobility device 18 supports the seated occupant in the passenger cabin during operation of the vehicle 10. The personal mobility device 18 may include wheels, as described above. As examples including wheels, the personal mobility device 18 may be a wheelchair or a scooter. As another example, the personal mobility device 18 may include a continuous track. In such an example, the continuous track is in contact with ground and personal mobility device 18 may include wheels that transmit torque to the continuous track.

With reference to FIG. 3, The roof 14 may include an exterior panel 74 and a headliner 76. The headliner 76 and the exterior panel 74 may each provide a class-A surface e, i.e., a surface specifically manufactured to have a high-quality, finished aesthetic appearance free of blemishes. The roof 14 may include one or more support beams 78. The support beams 78 may extend along the cross-vehicle axis A2. The support beams 78 may be between the exterior panel 74 and the headliner 76.

The vehicle 10 includes a track assembly 80 supported by the roof 14. The track assembly 80 may include one or more tracks 82, 84. For example, the track assembly 80 may include a first track 82 and a second track 84. The tracks 82, 84 may be between the exterior panel 74 and the headliner 76. The first track 82 may be supported by the support beams 78. For example, the first track 82 may be fixed to the support beams 78, e.g., with a fastener, etc. The first track 82 may be elongated along the cross-vehicle axis A1, as shown in FIGS. 1-2B and 4. For example, the first track 82 may extend from one side of the vehicle 10 to the other side of the vehicle 10, e.g., along the support beams 78.

The second track 84 may be elongated along the vehicle-longitudinal axis A2, as shown in FIGS. 1-2B and 4. The second track 84 may be supported by the first track 82. For example, the second track 84 may be slidably supported by the first track 82, e.g., such that second track 84 may translate along the cross-vehicle axis A1. For example, the first track 82 may define guides and the second track 84 may include rollers that are designed to roll along the guides. The second track 84 may be elongated along the vehicle-longitudinal axis A2.

The vehicle 10 includes an airbag assembly 86. The airbag assembly 86 may include the airbag housing 20, the airbag 22, and an inflator 88. The inflator 88 inflates the airbag 22 to the inflated position, as described further below. The airbag 22 is supported by the track assembly 80, e.g., via the airbag housing 20, as shown in FIG. 3. The airbag housing 20 houses the airbag 22 in the uninflated position and supports the airbag 22 in the inflated position. The airbag 22 may be rolled and/or folded to fit within the airbag housing 20 in the uninflated position. The airbag housing 20 may be of any suitable material, e.g., a rigid polymer, a metal, a composite, or a combination of rigid materials. The airbag housing 20 may, for example, include clips, panels, etc. for attaching the airbag 22 and for attaching the airbag assembly 86 to the track assembly 80.

The airbag housing 20 may be supported by the second track 84, as shown in the Figures. For example, the airbag housing 20 may be slidably supported by the second track 84, e.g., such that the airbag housing 20 may translate along the vehicle-longitudinal axis A1. For example, the second track 84 may define guides and the airbag housing 20 may include rollers that are designed to roll along the guides.

The airbag 22 in the uninflated position may be between the exterior panel 74 and the headliner 76, as shown in FIG. 3. That is, the airbag 22 may be spaced from the personal mobility device 18 along the axis A3 in the uninflated position. The airbag 22 is inflatable downwardly from the second track 84 to the inflated position, e.g., along the axis A3. For example, upon inflation, the airbag 22 may tear, rupture, separate, etc., the headliner 76 to move to the inflated position. The airbag 22 in the inflated position extends from the roof 14 toward the panel 16, i.e., toward the occupant seating area 30. Specifically, the airbag 22, in the inflated position, extends at least partially across the occupant seating area 30. For example, the airbag 22 may be spaced from the floor 12, i.e., the panel 16, in the inflated position, as shown in FIG. 4. As another example, the airbag 22 may extend to the floor 12, i.e., the panel 16, in the inflated position, i.e., entirely across the occupant seating area 30.

With reference FIG. 4, the airbag 22 is designed to surround the personal mobility device 18 in the inflated position. That is, in the inflated position, the airbag 22 surrounds the personal mobility device in a generally horizontal plane. The airbag 22 in the inflated position defines a passage 90 having an open bottom 92 that receives the occupant seating area 30. The airbag 22 extends around the passage 90 and around the occupant seating area 30. Specifically, the airbag includes an inner panel (not numbered) facing the passage 90 in the inflated position. The inner panel extends around the passage 90 and the occupant seating area 30. The airbag 22 includes an outer panel (not numbered) connected to the inner panel and defining an inflation chamber 94 therebetween. The inflation chamber 94 receives inflation medium during inflation, e.g., via the inflator 88. As the airbag 22 inflates to the inflated position, the personal mobility device 18 and the occupant therein may pass through the open bottom 92 such that the personal mobility device 18 and the occupant therein are within the passage 90 of the airbag 22. The airbag 22 may have any suitable shape, e.g., a hollow cylinder, a hollow rectangular prism, etc.

The airbag 22 is positioned to be impacted by the occupant in the personal mobility device 18 in the event of a vehicle impact. Since the airbag 22 surrounds the personal mobility device 18, in the event of a vehicle impact, the airbag 22 will control the kinematics of the occupant in any direction of movement of the occupant resulting from the vehicle impact. That is, surrounding the personal mobility device 18 provides omni-directional kinematic control of an occupant of such personal mobility device 18 during a vehicle impact. Said differently, regardless of the direction of vehicle impact, the airbag 22 will control the kinematics of the occupant.

The airbag 22 may be a woven polymer or any other material. In one example, the airbag 22 may be woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The inflator 88 is in fluid communication with the inflation chamber 94 of the airbag 22. The inflator 88 expands the airbag 22 with inflation medium, such as a gas, to move the airbag 22 from the uninflated position to the inflated position. The inflator 88 may be supported by any suitable component. For example, the inflator 88 may be supported by the airbag housing 20 and may move with the airbag 22 relative to the first and second tracks 82, 84. The inflator 88 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 88 may be, for example, at least partially in the inflation chamber 94 to deliver inflation medium directly to the inflation chamber or may be connected to the inflation chamber 94 through fill tubes, diffusers, etc.

One or more actuators 96, e.g., hydraulic type, lead-screw type, rack-and-pinion type, etc., may be designed to move the airbag 22 along the longitudinal axis A1 and/or the cross-vehicle axis A2, e.g., in response to an instruction from the computer 40. For example, one or more actuators 96 may be designed to move the second track 84 along the first track 82, e.g., by fixing one end of such actuators 96 to one of the tracks 82, 84 and another end to the other one of the tracks 82, 84. Additionally, one or more other actuators 96 may move the airbag 22 along the second track 84, e.g., by fixing one end of such actuators 96 to the second track 84 and another end to the airbag housing 20. Other designs than the example shown in the Figures may be used to move the airbag 22 relative to the roof 14, e.g., the airbag 22 may slide along the first track 82, and the first track 82 may slide along the second track 84, etc. The actuators 96 are connected to the computer 40, e.g., the RCM, via a wiring harness (not shown), and the computer 40 transmits signals to and/or receives signals from the actuators 96.

Figure 7:
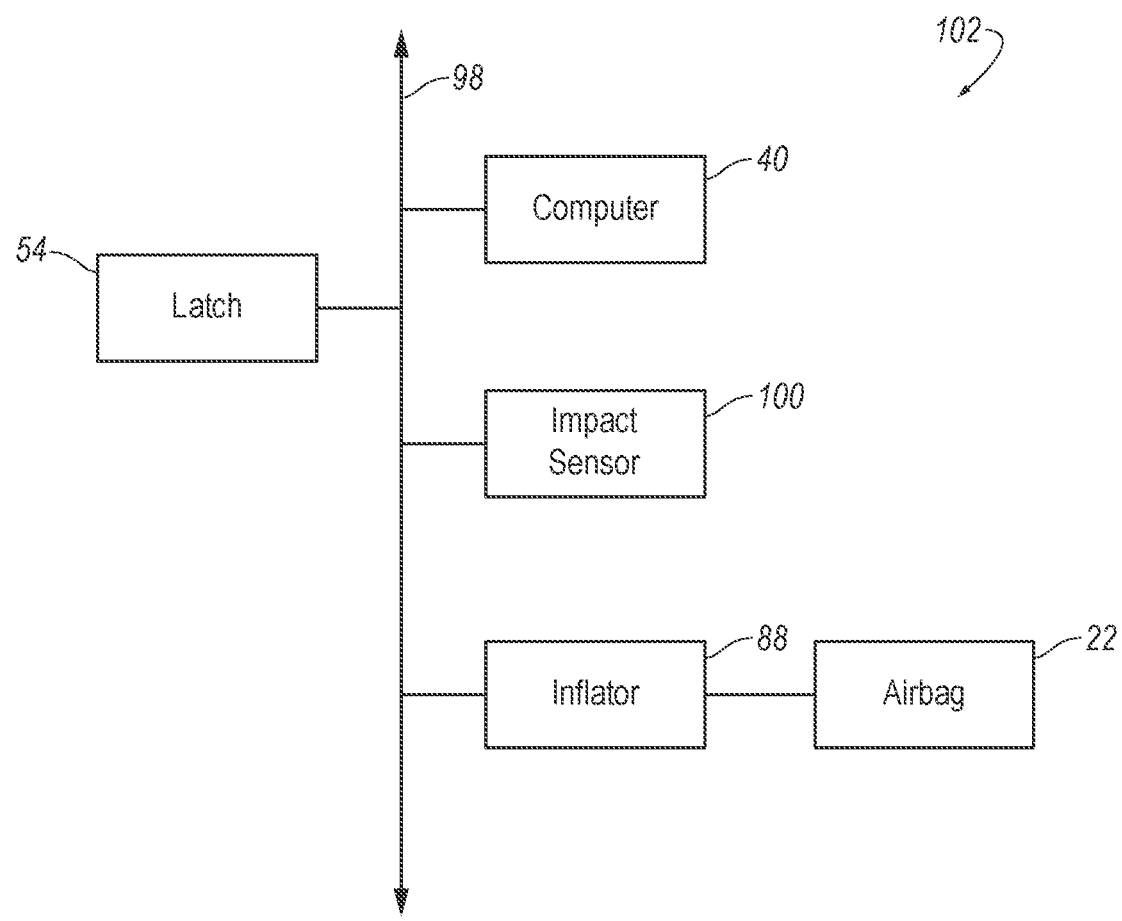
FIG. 7 is a block diagram showing a system of the vehicle.

With reference to FIG. 7, the vehicle may include a control system 102. The control system 102 may include the computer 40, an impact sensor 100, the airbag assembly 86, e.g., the inflator 88, in communication through a vehicle communication network 98.

The computer 40 of the vehicle 10 has a processor and memory storing instructions executable by the processor to control components of the vehicle 10. The memory stores instructions to perform the steps shown in FIG. 8 and as described below. The memory includes one or more forms of computer 40 readable media, and stores instructions executable by the computer 40 for performing various operations, including as disclosed herein. As in the example described above, the computer 40 may be a restraint control module (RCM). The restraint control module may be in communication with and may control the airbag 22, seatbelt retractors, seatbelt pretensioners, other airbags, etc., in the vehicle 10, among other functions.

The computer 40 may include or be communicatively coupled to, e.g., via a vehicle network such as a communications bus as described further below, more than one processor, e.g., included in components such as sensors, electronic controller units (ECUs) or the like included in the vehicle 10 for monitoring and/or controlling various vehicle 10 components, e.g., a powertrain controller, a brake controller, a steering controller, etc. The computer 40 is generally arranged for communications on the vehicle communication network 98 that can include a bus in the vehicle 10 such as a controller area network (CAN) or the like, and/or other wired and/or wireless mechanisms.

Via the vehicle network, the computer 40 may transmit messages to various devices in the vehicle 10 and/or receive messages (e.g., CAN messages) from the various devices, e.g., sensors, an actuator, a human machine interface (HMI), etc. Alternatively or additionally, in cases where the computer 40 actually comprises a plurality of devices, the vehicle communication network 98 may be used for communications between devices represented as the computer 40 in this disclosure. Further, as mentioned below, various controllers and/or sensors may provide data to the computer 40 via the vehicle communication network 98.

The impact detection sensors 100 may be programmed to detect a vehicle impact to the vehicle 10. The impact detection sensors 100 may be disposed in the vehicle 10. The impact detection sensors 100 may be of various types, e.g., pressure sensor, acceleration sensor, vision sensor, etc. When the vehicle impact occurs, the computer 40 may receive one or more signals from the impact detection sensors 100 indicating the vehicle impact. In response to receiving the signals from the impact detection sensors 100, the computer 40 may initiate the inflation of the airbag 22. Alternatively, the computer 40 may initiate the inflation of the airbag 22 selectively based on information from the impact detection sensors 100 identifying the physical characteristics of the vehicle impact, e.g., which side of the vehicle 10 impacted, amount of pressure applied to the vehicle 10, etc. and also seat occupancy information, e.g., by using the occupancy sensors disposed inside the seats 24 sensing the occupancy status of the seats 24.

The computer 40 may be programmed to determine a position of the personal mobility device 18 in the vehicle 10. The position of the personal mobility device 18 may be a translational position, e.g., relative to the vehicle-longitudinal axis A2 and the cross-vehicle axis A1. For example, the position of the personal mobility device 18 may be a distance of such personal mobility device 18 from the front and/or the rear of the vehicle 10, and a distance of such personal mobility device 18 from the right-side and/or left side of the vehicle 10. The position of each seat 24 may be identified by the computer 40 based on connection of the panel wiring harness 64. For example, the computer 40 may store in the memory a look-up table or the like associating various translational positions of recesses 28 with translational positions of the airbag 22. In other words, the computer 40 can store a translational position for each recess 28 in the floor 12. Upon receiving a signal via the vehicle wiring harness 66 indicating the panel 16 is attached to the vehicle wiring harness 66 and the latch 54 is in the latched position, the computer 40 can determine the position of the personal mobility device 18 is the position of the corresponding recess 28.

Upon determining the position of the personal mobility device 18, the computer 40 may be programmed to initiate movement of the airbag 22. Specifically, the computer 40 may be programmed to instruct the actuators 96 to move the airbag 22 based on the position of the personal mobility device 18. The computer 40 may instruct the actuators 96, e.g., via the communication network, to translate the airbag 22 relative to the second track 84 and/or to translate the second track 84 relative to the first track 82. That is, the computer 40 may instruct the actuators 96 to move the airbag 22 along at least one of the cross-vehicle axis A1 or the vehicle-longitudinal axis A2. The computer 40 may translate the airbag 22 such that the airbag 22 is positioned relative to the personal mobility device 18 and/or the occupant therein to control kinematics of such occupant. The computer 40 may detect the translational position of the airbag 22, e.g., for use in closed loop positioning of the airbag 22 to its commanded positions above the personal mobility device 18.

Figure 8:
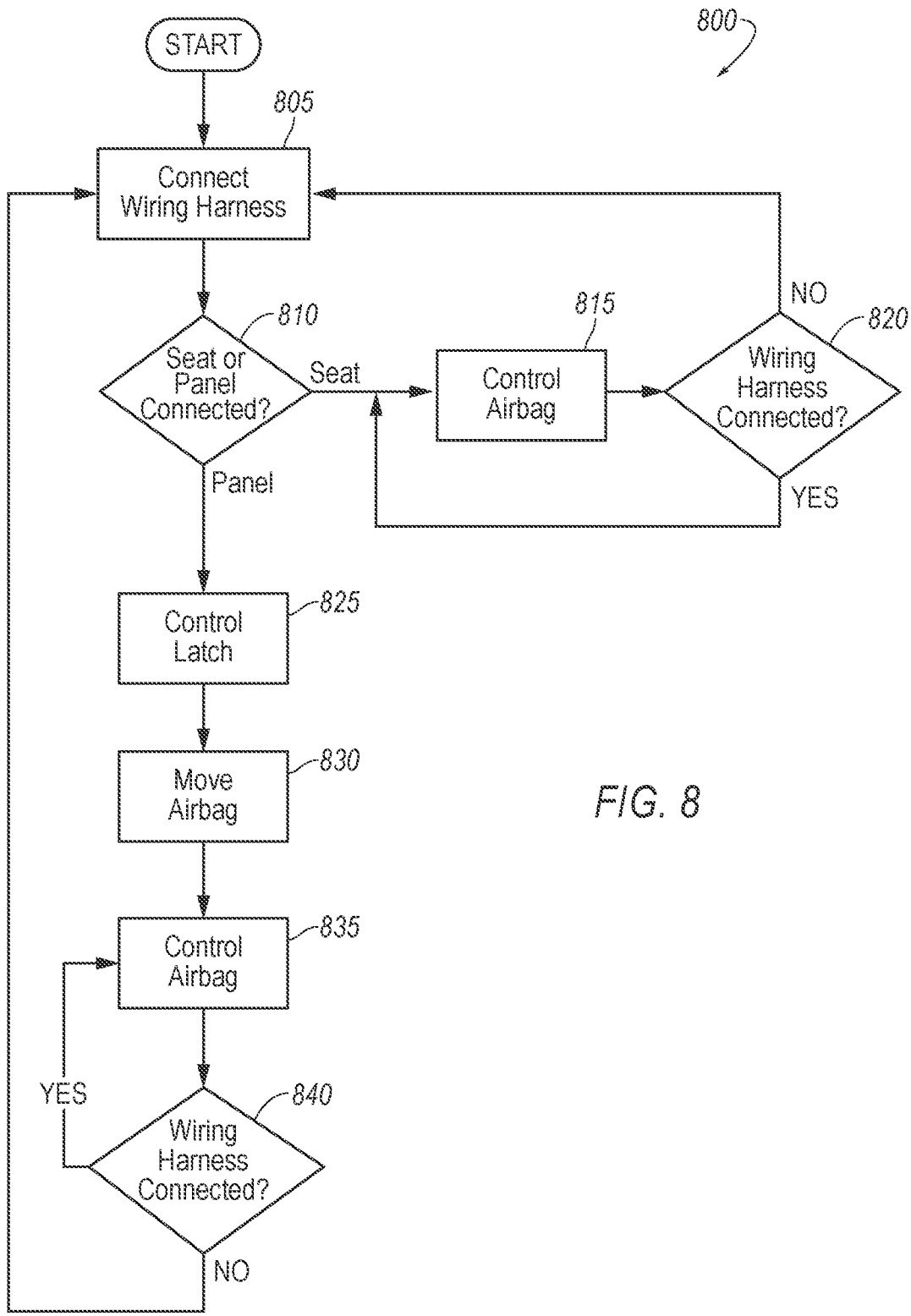
FIG. 8 is a flowchart showing instructions executable by a computer of the vehicle.

With reference to FIG. 8, the computer 40, e.g., RCM, stores instructions to control components of the vehicle 10 according to the method 800 shown in FIG. 8. Specifically, as shown in FIG. 8, the computer 40 determines whether a panel 16 or a seat 24 is connected to the computer 40 and controls components of the vehicle 10 in response to that determination. The computer 40 may perform the method 800 for each vehicle wiring harness 66 to individually control components of the vehicle 10 at each occupant seating area 30. "In response to" and "based on" are used throughout this text to indicate a causal relationship, not merely a temporal relationship. For example, the computer 40 controls components of the vehicle 10 as a direct result of determining whether the seat 24 or the panel 16 is connected to the computer 40.

With reference to block 805, the method includes connecting a wiring harness 38, 64 to the computer 40, as described above. For example, this may include the connection of the panel wiring harness 64 to the vehicle wiring harness 66 or the connection of the seat wiring harness 38 to the vehicle wiring harness 66.

With reference to the block 810, the computer 40 determines whether the panel 16 is connected to the computer 40 or the seat 24 is connected to the computer 40. Specifically, as set forth above, the vehicle wiring harness 66 transmits signals to and from the computer 40. When the seat wiring harness 38 is connected to the vehicle wiring harness 66, signals from components of the seat 24 to the computer 40 and signals from the computer 40 to components of the seat 24 are communicated through the seat wiring harness 38 and the vehicle wiring harness 66. When the panel wiring harness 64 is connected to the vehicle wiring harness 66, signals from the latch 54 to the computer 40 and signals from the computer 40 to the latch 54 are communicated through the panel wiring harness 64 and the vehicle wiring harness 66. The computer 40 may identify the seat 24 or the panel 16 based on these communications. For example, when connected to the panel wiring harness 64, the computer 40 may detect signals or other indicators from the latch 54 to identify that the panel 16 is connected to the computer 40. When connected to the seat wiring harness 38, the computer 40 may detect signals or other indicates from one or more components of the seat 24, e.g., a seatbelt retractor, a seat airbag, etc., to identify that the seat 24 is connected to the computer 40. As shown in FIG. 8, the operation of the computer 40, i.e., which instructions are used, is based on the determination in block 810.

With reference to block 825, when the panel 16 is installed in the vehicle 10, the computer 40 may include instructions to control operation of the latch 54 based on detection of the panel 16. For example, the computer 40 may move the latch 54, e.g., the solenoid 56, between the latched and unlatched position. Specifically, the computer 40 may move the latch 54 based on an automatic identification that a personal mobility device 18 is present on the panel 16 and/or may be based on manual input from an occupant that a personal mobility device 18 is on the panel 16, e.g., through a human-machine interface. As another example, the computer 40 may receive a signal from the latch 54 that the latch 54 is in the latched position or the unlatched position. The computer 40 may use this information to control operation of the airbag 22 and/or to prevent motion of the vehicle 10.

With reference to block 830, when the personal mobility device 18 is present on the panel 16, i.e., the latch 54 is in the latched position, the computer 40 may include instructions to control the actuators 96. That is, the computer 40 may include instructions to move the airbag 22. Specifically, the computer 40 may determine the position of the personal mobility device 18 relative to the vehicle 10, as discussed above. The computer 40 can then control the actuators 96 to move the airbag 22 to correspond to a position of the personal mobility device 18. In other words, the airbag 22 may move relative to the first track 82 and/or the second track 84 to align with the personal mobility device 18, e.g., along the cross-vehicle axis A1 and/or the vehicle-longitudinal axis A2.

Specifically, with reference to block 835, the computer 40 may include instructions to control the airbag 22 based on the detection of the panel 16. Specifically, the computer 40 may control inflation timing, inflation pressure (e.g., with variable control of one or more inflators 88 as is known), airbag thickness and/or stiffness (e.g., by controlling internal tethers of the airbag 22 as is known) in a way suitable for an occupant of a personal mobility device 18 supported by the panel 16 in the event of a vehicle impact. In other words, an occupant of a personal mobility device 18 on the panel 16 may be positioned differently than an occupant in a seat 24, and the operation of airbag 22 is tailored to the position of the occupant in the personal mobility device 18 when the panel 16 is detected in block 810.

With reference to block 815, when the seat 24 is installed in the vehicle 10, the computer 40 may include instructions to control other airbags based on the detection of the seat 24. For example, the computer 40 may control curtain airbags, seat-mounted airbags, floor mounted airbags, etc., based on the detection of the seat 24. Specifically, the computer 40 may control inflation timing, inflation pressure (e.g., with variable control of one or more inflators as is known), airbag thickness and/or stiffness (e.g., by controlling internal or external tethers of the airbag(s) as is known) in a way suitable for the occupant of the seat 24 in the event of a vehicle impact. In other words, an occupant of the seat 24 may be positioned differently than an occupant in a personal mobility device 18 on the panel 16, and the operation of the other airbags are tailored to the position of the occupant on the seat 24 when the seat 24 is detected in block 810.

As shown in blocks 820 and 840, the computer 40 may detect a disconnection of the panel wiring harness 64 or the seat wiring harness 38 from the vehicle wiring harness 66. As another example, the computer 40 may detect a connection of a different wiring harness to the vehicle wiring harness 66. In either scenario, as shown at blocks 820 and 840, the computer 40 restarts the method 800.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper internal and fiber optics, including the internals that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

What is claimed is:

1. A vehicle comprising:
a floor;
a panel removably attachable to the floor, the panel being designed to engage a personal mobility device;
a seat removably attachable to the floor;
a roof;
an airbag housing supported by the roof and moveable relative to the roof along a cross-vehicle axis and along a vehicle-longitudinal axis;
an airbag supported by the airbag housing, the airbag being inflatable to an inflated position that extends from the airbag housing towards the floor; and
a computer having a processor and memory;
a panel wiring harness supported by the panel and releasably connectable to the computer;
a seat wiring harness supported by the seat and releasably connectable to the computer;
the memory of the computer storing instructions executable by the processor of the computer to:
determine whether the panel wiring harness or the seat wiring harness is connected to the computer;
control the airbag based on detection of connection of the panel wiring harness to the computer; and control the airbag based on detection of connection of the seat wiring harness to the computer, the control of the airbag based on detection of connection of the panel wiring harness to the computer being different than control of the airbag based on detection of the panel wiring harness to the computer.

2. The vehicle of claim 1, wherein the airbag is designed to surround a personal mobility device in the inflated position.

3. The vehicle of claim 1, wherein the airbag housing is translatable relative to the roof.

4. The vehicle of claim 1, further comprising a track assembly including a first track fixed to the roof and a second track slidably engaged with the first track, the airbag housing being slidably engaged with the second track.

5. The vehicle of claim 4, wherein the first track is elongated along the cross-vehicle axis, and the second track is elongated along the vehicle-longitudinal axis.

6. The vehicle of claim 1, further comprising:
a latch supported by the panel and being designed to releasably engage a personal mobility device between a latched position and an unlatched position; and
the wiring harness is connected to the latch;
wherein the memory stores further instructions executable to move the airbag additionally based on determining the latch is in the latched position.

7. The vehicle of claim 6, wherein the memory stores further instructions executable to determine the latch is in the latched position based on connection of the wiring harness to the computer.

8. The vehicle of claim 1, wherein the memory stores further instructions executable to determine the position of the personal mobility device based on connection of the wiring harness to the computer.

9. The system of claim 8, wherein the memory stores instructions executable to move the airbag based on the position of the personal mobility device.

10. The vehicle of claim 1, wherein the floor includes fastener holes arranged in a pattern and the panel includes fastener holes arranged in the pattern, and further comprising fasteners engaging the panel to the floor through the fastener holes of the panel and the floor.

11. The vehicle of claim 1, wherein the airbag, in an uninflated position, is designed to be spaced from a personal mobility device along an axis extending transverse to the cross-vehicle axis and the vehicle-longitudinal axis.

12. The vehicle of claim 1, further comprising an actuator supported by the roof and designed to move the airbag housing.

13. The vehicle of claim 1, further comprising an inflator supported by the airbag housing.

14. A system, comprising a computer including a processor and a memory, the memory storing instructions executable by the processor to:
detect that a seat wiring harness supported by a seat is connected to the computer;
control an airbag based on detection of the connection of the seat wiring harness to the computer;
detect that a panel wiring harness supported by a panel is connected to the computer;
control the airbag based on detection of connection of the seat wiring harness to the computer, the control of the airbag based on detection of connection of the panel wiring harness to the computer being different than control of the airbag based on detection of the panel wiring harness to the computer;
determine a position of a personal mobility device in response to detecting the personal mobility device engaged with the panel; and
move an airbag housing supported by a roof relative to the roof along a cross- vehicle axis and along a vehicle-longitudinal axis, an airbag being supported by the airbag housing, the airbag being inflatable to an inflated position that extends from the airbag housing towards a floor of the vehicle.

15. The system of claim 14, wherein the memory stores further instructions executable to control inflation of the airbag based on connection of a wiring harness to the computer, the wiring harness being supported by the panel.

16. The system of claim 14, wherein the memory stores further instructions executable to determine the panel is attached to the floor based on connection of a wiring harness to the computer, the wiring harness being supported by the panel.

17. The system of claim 14, wherein the memory stores further instructions executable to determine the position of the personal mobility device based on connection of a wiring harness to the computer, the wiring harness being supported by the panel.

18. The system of claim 14, wherein the memory stores further instructions executable to move the airbag additionally based on determining a latch is in a latched position, the latch is supported by the panel and is moveable to a latched position engaged with the personal mobility device.

19. The system of claim 18, wherein the memory stores further instructions executable to determine the latch is in the latched position based on connection of a wiring harness to the computer, the wiring harness being supported by the panel.

* * * * *